(12) United States Patent
Fang et al.

(10) Patent No.: US 8,643,821 B2
(45) Date of Patent: Feb. 4, 2014

(54) 3D DISPLAY PANEL AND METHOD FOR MANUFACTURING THE SAME

(75) Inventors: Bin Fang, Shenzhen (CN); Chia-chiang Hsiao, Shenzhen (CN); Chih-Wen Chen, Shenzhen (CN)

(73) Assignee: ShenZhen China Star Optoelectronics Technology Co., Ltd., Guangdong (CN)

( * ) Notice: Subject to any disclaimer, the term of this patent is extended or adjusted under 35 U.S.C. 154(b) by 48 days.

(21) Appl. No.: 13/378,041

(22) PCT Filed: Nov. 15, 2011

(86) PCT No.: PCT/CN2011/082180
§ 371 (c)(1),
(2), (4) Date: Dec. 13, 2011

(87) PCT Pub. No.: WO2013/060050
PCT Pub. Date: May 2, 2013

(65) Prior Publication Data
US 2013/0100383 A1    Apr. 25, 2013

(51) Int. Cl.
*G02F 1/1335* (2006.01)
(52) U.S. Cl.
USPC ............... 349/187; 349/15; 349/96; 349/117; 349/122

(58) Field of Classification Search
USPC .............. 349/15, 96, 117, 122, 187; 359/464, 359/465, 489.07; 348/58; 156/60, 99
See application file for complete search history.

(56) References Cited

U.S. PATENT DOCUMENTS

| | | | |
|---|---|---|---|
| 5,956,001 A * | 9/1999 | Sumida et al. | 345/55 |
| 2009/0066887 A1 * | 3/2009 | Fukagawa et al. | 349/96 |
| 2009/0303421 A1 * | 12/2009 | Lee et al. | 349/96 |
| 2010/0134737 A1 * | 6/2010 | Kawamoto et al. | 349/119 |
| 2010/0225682 A1 * | 9/2010 | Nakahata | 345/695 |
| 2011/0050871 A1 * | 3/2011 | Lee et al. | 348/58 |
| 2011/0261299 A1 * | 10/2011 | Tai et al. | 349/98 |
| 2013/0063685 A1 * | 3/2013 | Hsiao et al. | 349/96 |

* cited by examiner

*Primary Examiner* — Dung Nguyen
*Assistant Examiner* — Tai Duong

(57) ABSTRACT

The present invention provides a 3D display panel and a method for manufacturing the same. The method comprises the following steps: forming a liquid crystal layer between a first substrate and a second substrate; arranging a polarizer at an outer side of the second substrate; providing a 3D display plate; and arranging the 3D display plate at an outer side of the first substrate. The present invention can improve the viewing angle problem existing in the conventional 3D display.

4 Claims, 3 Drawing Sheets

3D DISPLAY PANEL AND METHOD FOR MANUFACTURING THE SAME

FIELD OF THE INVENTION

The present invention relates to a display panel and a method for manufacturing the same, and more particularly to a three-dimensional (3D) display panel for displaying 3D images and a method for manufacturing the same.

BACKGROUND OF THE INVENTION

Liquid crystal displays (LCDs) have been widely applied in electrical products. Currently, most of LCDs are backlight type LCDs which include a liquid crystal panel and a backlight module.

At present, the LCDs are capable of having a 3D image displaying function, such as a 3D pattern retarder display which has a half (½) wave plate and a quarter (¼) wave plate being disposed at an outer side of an LCD panel.

In general, the pattern retarder display has left image pixels and right image pixels. The left image pixels are positioned at odd pixel rows (or even pixel rows) of the display, and the right image pixels are positioned at the other pixel rows thereof. When the light of the display passes through the half-wave phase retarders and the quarter-wave phase retarders with different orientations, the light is transformed into a left handed circularly polarized light and a right handed circularly polarized light, respectively. A user can use circular polarizer glasses with different polarized directions such that the user's left eye only sees images of the left image pixels, and the user's right eye only sees images of the right image pixels. Therefore, the 3D image effect of the display is achieved.

However, when a user squints at the conventional 3D display, the light rays emitted from the 3D display are likely to be non-circularly polarized light rays (such as elliptically polarized light), and thus an image crosstalk easily arises to deteriorate a 3D display quality. That is, the conventional 3D display is likely to have a viewing angle problem.

SUMMARY OF THE INVENTION

The present invention provides a 3D display panel and a method for manufacturing the same, so as to improve the viewing angle problem existing in the conventional 3D display.

A primary object of the present invention is to provide a 3D display panel, and the 3D display panel comprises: a first substrate; a second substrate; a liquid crystal layer formed between the first substrate and the second substrate; a polarizer disposed at an outer side of the second substrate; and a 3D display plate disposed at an outer side of the first substrate, wherein the 3D display plate comprises two protection films, a polarizing film and a quarter wave film, and the polarizing film and the quarter wave film are disposed between the protection films, and the quarter wave film contacts the polarizing film.

In one embodiment of the present invention, the 3D display panel further comprises a cover substrate disposed on the 3D display plate.

In one embodiment of the present invention, the protection films are triacetyl cellulose (TAC) films.

In one embodiment of the present invention, the polarizing film is a poly vinyl alcohol (PVA) film.

Another object of the present invention is to provide a method for manufacturing a 3D display panel, comprising the following steps: forming a liquid crystal layer between a first substrate and a second substrate; arranging a polarizer at an outer side of the second substrate; providing a 3D display plate, wherein the 3D display plate comprises two protection films, a polarizing film and a quarter wave film, and the polarizing film and the quarter wave film are disposed between the protection films, and the quarter wave film contacts the polarizing film; and arranging the 3D display plate at an outer side of the first substrate.

In one embodiment of the present invention, the step of providing the 3D display plate comprises: bonding the quarter wave film to one of the protection films; and assembling another one of the protection films, the polarizing film, the pre-bonded quarter wave film and the one of the protection film as one piece.

In one embodiment of the present invention, the protection films, the polarizing film and the pre-bonded quarter wave film are assembled as one piece by means of rollers.

In one embodiment of the present invention, the step of providing the 3D display plate further comprises: drying the assembled protection films, the polarizing film and the quarter wave film.

In comparison with the viewing angle problem existing in the conventional 3D display, by means of the 3D display panel of the present invention and the method for manufacturing the same, the polarizing film and the quarter wave film are integrated into one piece, so as to bond the quarter wave film to the polarizing film, hence preventing the undesired optical path difference, as well as improving the viewing angle problem existing in the conventional 3D display to enhance a display quality if the 3D display panel.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

Figure 1:
FIG. 1 is a partially cross-sectional view showing a display apparatus according to an embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a partially cross-sectional view showing a display apparatus according to an embodiment of the present invention is illustrated. The 3D display panel 100 of the present embodiment is capable of displaying 3D images. The 3D display panel 100 can be assembled with a backlight module 101, thereby forming a display apparatus. The display panel 100 is disposed opposite to the backlight module 101, and the backlight module 101 may be realized as an edge lighting backlight module or a bottom lighting backlight module to provide the liquid crystal display panel 100 with the back-light.

Referring to FIG. 1 again, the display panel 100 of the present embodiment can comprise a first substrate 110, a second substrate 120, a liquid crystal layer 130, a polarizer 140, a 3D display plate 150 and a cover substrate 160. The first substrate 110 and the second substrate 120 may be realized as glass substrates or flexible plastic substrates. In this embodiment, the first substrate 110 may be a glass substrate or other material substrates with color filters (CF), and the second substrate 120 may be a glass substrate or other material substrates with a thin film transistor (TFT) array. It should be noted that the CF and the TFT array may also be disposed on the same substrate in other embodiments.

Referring to FIG. 1 again, the liquid crystal layer 130 is formed between the first substrate 110 and the second substrate 120. The polarizer 140 is disposed on an outer side of the second substrate 120, and the 3D display plate 150 is disposed on an outer side of the first substrate 110. The cover substrate 160 is disposed on the 3D display plate 150. The cover substrate 160 is, for example, a cover lens which is preferably made of a material of high strength, such as glass, carbon fiber, reinforced plastics or any combination thereof, for protecting and packaging the structure of the display panel 100.

Referring to FIG. 1 again, the 3D display plate 150 configured to form a circularly polarized light. The 3D display plate 150 comprises two protection films 151, 152, a polarizing film 153 and a quarter wave film 154, and the polarizing film 153 and the quarter wave film 154 are disposed between the protection films 151, 152, and the quarter wave film 154 contacts the polarizing film 153.

Referring to FIG. 1 again, the protection films 151, 152 may be triacetyl cellulose (TAC) films for protecting and supporting the polarizing film 153 and the quarter wave film 154. The polarizing film 153 is disposed close to the first substrate 110 for transforming a light into a linearly polarized light. The polarizing film 153 may be a poly vinyl alcohol (PVA) film. The quarter wave film 154 is adhered between the polarizing film 153 and the protection film 152 and close to the cover substrate 160 for transforming the linearly polarized light which is emitted from the polarizing film 153 into the circularly polarized light.

Figure 2:
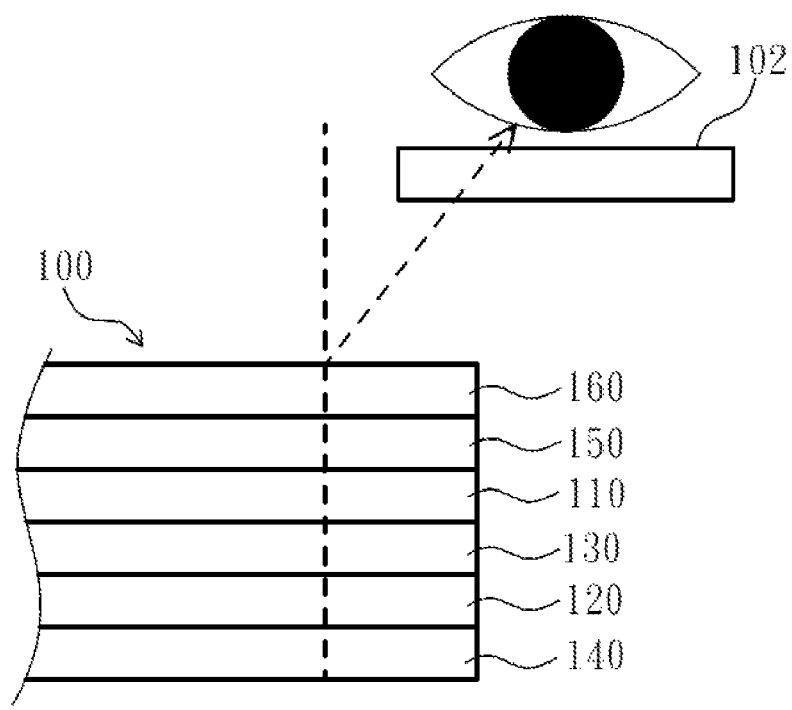
FIG. 2 is a schematic diagram showing the 3D display apparatus according to the preferred embodiment of the present invention.

Referring to FIG. 2, a schematic diagram showing the 3D display apparatus according to the preferred embodiment of the present invention is illustrated. In this embodiment, the quarter wave film 154 directly contacts the polarizing film 153. That is, there is no medium (such as a TAC film or an adhesion layer) between the quarter wave film 154 and the polarizing film 153. Therefore, the linearly polarized light emitted from the polarizing film 153 can directly enter the quarter wave film 154 without the undesired optical path difference. Accordingly, when a user wears polarizer glasses 102 to squint at the 3D display panel 100 of the present embodiment, i.e. when an optical path between eyes of the user and of the 3D display panel 100 is not vertical to a plane of the 3D display panel 100, by means of the 3D display plate 150, it is ensured that the light emitted from the 3D display panel 100 is the circularly polarized light, so as to mitigate the image crosstalk, hence improving the viewing angle problem.

Figure 3:
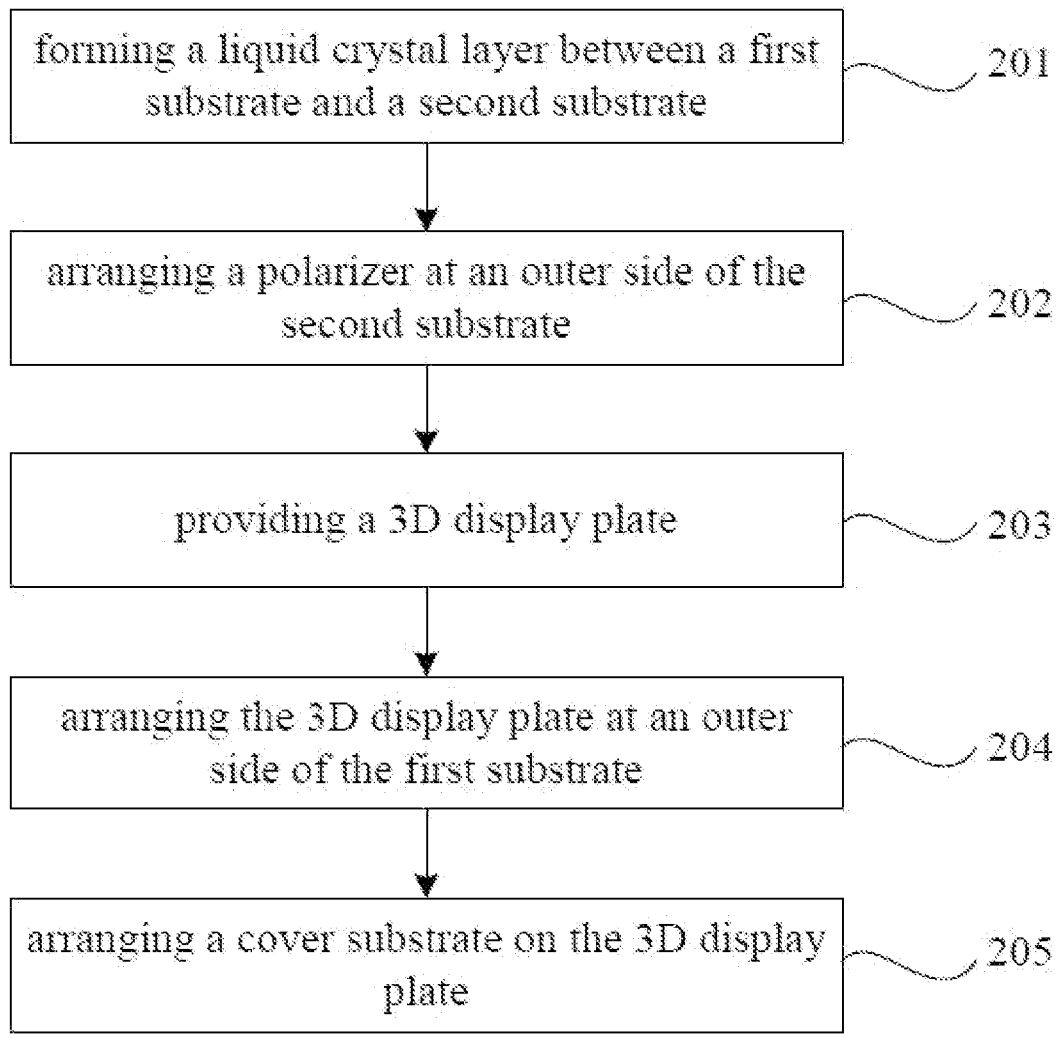
FIG. 3 is a flowchart of a method for manufacturing the 3D display panel according to the preferred embodiment of the present invention.

Referring to FIG. 3, a flowchart of a method for manufacturing the 3D display panel according to the preferred embodiment of the present invention is illustrated. The method of the present invention for manufacturing the 3D display panel 100 comprises the following steps: forming the liquid crystal layer 130 between the first substrate 110 and the second substrate 120 (step 201); arranging the polarizer 140 at the outer side of the second substrate 120 (step 202); providing the 3D display plate 150 (step 203); arranging the 3D display plate 150 at the outer side of the first substrate 110 (step 204); and arranging the cover substrate 160 on the 3D display plate 150.

Figure 4:
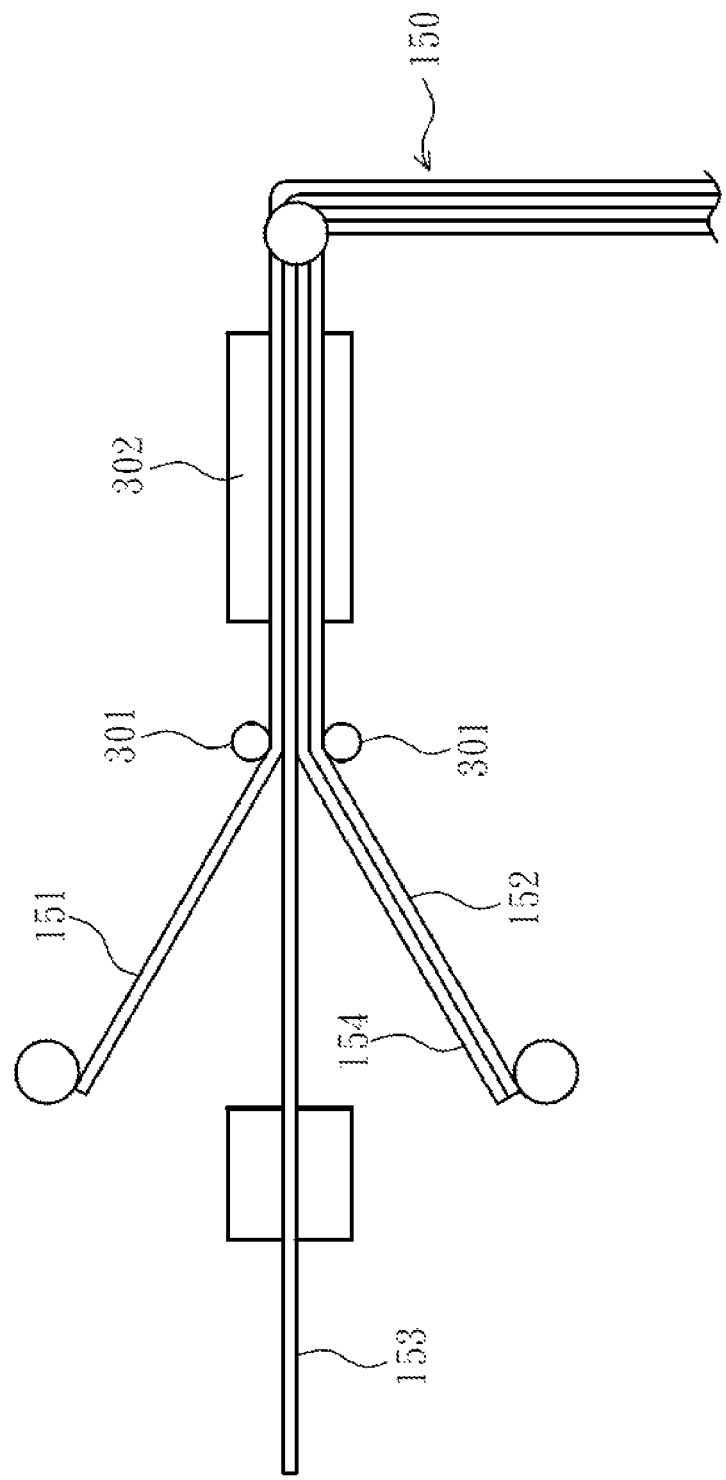
FIG. 4 is a schematic diagram showing a process for manufacturing the 3D display panel according to the preferred embodiment of the present invention.

Referring to FIG. 3 and FIG. 4, FIG. 4 is a schematic diagram showing a process for manufacturing the 3D display panel according to the preferred embodiment of the present invention. In the step 203, when providing the 3D display plate 150, firstly, the quarter wave film 154 is bonded to the protection film 152, and then the protection film 151, the polarizing film 153, the pre-bonded quarter wave film 154 and the protection film 152 are assembled as one piece, so as to achieve the 3D display plate 150. In this embodiment, as shown in FIG. 3, by means of rollers 301, the protection film 151, the polarizing film 153, the pre-bonded quarter wave film 154 and the protection film 152 can be assembled at the same time to form the 3D display plate 150, wherein the polarizing film 153 and the quarter wave film 154 are adhered between the two protection films 151 and 152. Subsequently, the assembled 3D display plate 150 (the two protection films 151 and 152, the polarizing film 153 and the quarter wave film 154) can be dried by a drier 302, so as to achieve the 3D display plate 150.

Referring to FIG. 1 again, in the step 204, arranging the 3D display plate 150 at the outer side of the first substrate 110, the protection film 151 is bonded to the outer side of the first substrate 110, and the polarizing film 153 is close to the first substrate 110.

As described above, with the use of the 3D display panel 100 of the present invention and the method for manufacturing the same, the polarizing film 153 and the quarter wave film 154 are integrated into one piece, so as to allow the quarter wave film 154 to directly contact with the polarizing film 153, hence preventing the undesired optical path difference between the polarizing film 153 and the quarter wave film 154, as well as improving the viewing angle problem existing in the conventional 3D display to enhance a display quality if the 3D display panel 100.

The present invention has been described above with a preferred embodiment thereof, and it is understood that many changes and modifications to the described embodiment can be carried out without departing from the scope and the spirit of the invention that is intended to be limited only by the appended claims.

The invention claimed is:

1. A method for manufacturing a 3D display panel, comprising the following steps:

forming a liquid crystal layer between a first substrate and a second substrate;

arranging a polarizer at an outer side of the second substrate;

providing a 3D display plate, wherein the 3D display plate comprises two protection films, a polarizing film and a quarter wave film, and the polarizing film and the quarter wave film are disposed between the protection films, and the quarter wave film contacts the polarizing film; and arranging the 3D display plate at an outer side of the first substrate;

wherein the step of providing the 3D display plate comprises:

bonding the quarter wave film to one of the protection films; and assembling another one of the protection films, the polarizing film, the pre-bonded quarter wave film to the one of the protection film as one piece, wherein the another one of the protection films, the polarizing film and the pre-bonded quarter wave film are assembled as one piece by means of rollers.

2. The method according to claim 1, wherein the step of providing the 3D display plate further comprises:

after assembling the another one of the protection films, the polarizing film, the pre-bonded quarter wave film to the one of the protection films as one piece, drying the one of the protection films, the another one of the protection films assembled protection films, the polarizing film and the quarter wave film.

3. The method according to claim 1, wherein the protection films are TAC films.

4. The method according to claim 1, wherein the polarizing film is a PVA film.

* * * * *